United States Patent Office

3,093,483
Patented June 11, 1963

3,093,483
PROCESS FOR PREPARING A FOOD PRODUCT HAVING A FIBROUS TEXTURE AND THE RESULTING PRODUCT
Norman H. Ishler, Valley Cottage, Robert V. MacAllister, West Nyack, Alina S. Szczesniak, Yonkers, and Eric Engel, Tarrytown, N.Y., assignors to General Foods Corporation, White Plains, N.Y., a corporation of Delaware
No Drawing. Filed Aug. 10, 1961, Ser. No. 130,697
34 Claims. (Cl. 99—131)

The present invention relates to a unique edible nutritious food product having a fiber-like texture. In particular, it relates to unique food products and the methods of producing these products whereby foodstuffs are provided which have a distinct eating quality and fibrous texture simulating that of many biscuits, dry cereals, meat and the like. By the term "meat" is meant not only the meat of mammals, but also the meat of fish, fowl, shell fish and crustaceans. The present application is a continuation-in-part of Serial 769,551, filed October 27, 1958, now abandoned.

Many efforts have heretofore been made to develop satisfactory meat substitutes which would possess protein and which would simulate the texture, flavor and the appearance of commercially available meat products. The prior art has disclosed, for instance, the preparation of meat substitutes from edible protein materials such as soy bean, corn or peanut protein, as well as from animal protein such as casein. These protein materials are produced in the form of fibers or filaments which are coagulated in a suitable bath and oriented by suitable means, such as a series of rolls operating at different speeds whereby the fibers or filaments are stretched between spaced pairs of rolls. The fibers or filaments are then placed in a salt solution (such as sodium chloride) of sufficient concentration to prevent the fibers of filaments from dissolving. Groups of these fibers or filaments may then be freed from excess liquid by squeezing or centrifuging, mixed with a suitable edible binder, and arranged into tows.

Although such prior art processes, which are extensions of the art of making man-made fibers for textiles, offer to some degree products having fibrous textures, the products of these processes have their limitations. Thus, the products of such prior art processes cannot be utilized in household recipes where baking, boiling, broiling, frying, toasting, and cooking generally are practiced, since the products are heat labile and hence do not retain their original shape and meat-like characteristics upon cooking or heating. When serving such products in cooked form, for instance, they break prematurely and do not create the satisfaction which one derives from mastication such that there is little or no relationship between any visual appeal before cooking and their eating quality after cooking.

It is therefore an object of this invention to produce a fibrous food product which can be subjected to recipe conditions calling for cooking of the product.

It is another object of this invention to produce a fibrous food product which contains a substantial portion of protein.

It is a more specific object of this invention to produce a fibrous food product wherein the individual fibers are not formed by extrusion of protein as the continuous phase whereby the aforesaid difficulties accompanying the use of protein fibers are avoided. A further object of the invention is to provide a fibrous food product wherein various modifying agents and additives can be incorporated in order to create novel and distinct eating qualities.

It has now been discovered that it is possible to provide various novel food products which meet the foregoing objects. These products are produced by forming a sol of a polymeric carbohydrate gel precursor capable of producing a continuous thermostable gel and the sol is formed into oriented, gelled fibers. The fibers are gelled with an alkaline earth metal ion, typically a calcium ion.

It has further been found that particularly desirable products can be produced by forming fibers from a sol of a polymeric carbohydrate gel precursor capable of producing a continuous thermostable gel containing a modifying agent. Such fibers can also be aggregated to form fibrous compositions having unique textures and eating qualities. The modifying agents may include various modifiable or inert proteinaceous materials, various farinaceous materials, as well as other non-proteinaceous materials such as carbohydrates, fats, colors, flavors, seasonings and plasticizers. The term "modifying agent" as employed in the present invention is intended to include materials capable of actually modifying the gel forming characteristics of the aforesaid gel precursors, as well as additives which would simply be carried by such gel precursors; included in the former class of compounds are such compositions as raw farinaceous doughs like raw wheat flour dough, raw corn flour dough, raw starch doughs, etc., calcium caseinate, plasticizers, fats, etc.; included in the latter class of compounds and considered as additives are such materials as relatively inert filler materials, colors and flavors, inert proteins, such as various seed meals, cottonseed meal, soy bean meal, and farinaceous materials such as cooked wheat flour, corn flour, starches, etc. It will be seen, therefore, that the term "modifying agent" is employed in the broad sense to include agents which either modify the gel forming characteristics of the aforesaid gel precursors or modify the eventual eating quality of the fibrous product to be produced therefrom.

The modifying agent employed in accordance with the present invention is intended to serve a number of useful purposes in the present fiber and may be "fixed" therein by incorporation into the gel precursors at any point in the process of fiber formation, the preferred object being to incorporate the modifying agent into the fiber rather than on the fiber in order to more effectively obtain the characteristics desired although they may also be added to the formed fibers. Preferably such modifying agents are added before or during gelation of the gel precursor, but as an alternative they can be added subsequent to such gelation.

As used in this invention the term "thermostable gels" refers to those gels which will not reverse into a sol upon heating at temperatures required to cook or heat the food product, such heat treatment ranging from gentle warming to deep fat frying.

When it is desired to prepare fibrous meat-like products then preferably dispersed throughout the sol is an inert proteinaceous material, although a modifiable proteinaceous material which is capable of being transformed from a sol state into a substantially solid state can also be employed; such modifiable proteinaceous material can be coagulable or precipitable in the presence of modifiers such as acid, heat or a polyvalent cation. When it is desired to prepare fibrous cereal products then preferably dispersed through the sol is a raw cereal flour capable of being transformed from the raw to the cooked state in the presence of heat.

The combined sol thus produced is formed into fibers, preferably by extrusion and using many of the fiber-orienting procedures of the man-made textile prior art, to wit: a spinnerette capable of producing fibers having a thickness in the order of 0.003 inch to 0.050 inch in mean diameter (although even higher cross-sectional dimensions are contemplated). In this connection the term "fibers" is intended to describe shapes which are of substantially greater dimensions in length than in cross- section and of such slenderness as to be susceptible to being aggregated with other like fibers into heterogeneous bundles, tows and like composites by means of suitable edible binders or modifying agents.

By the term "orienting" as use herein is meant the alignment of the polymer chains along the longitudinal axis of the fiber or alignment of the polymer chains in an essentially parallel relationship to one another, which in effect reduces the intermolecular spacing between the polymer chains, decreases the cross-sectional fiber diameter, and increases the tensile strength and/or firmness of the fiber. Typical of the fiber orienting techniques which may be employed in producing the desired results of the present invention are the use of collecting reels which pick up the fibers from the gelling bath at a rate faster than the liquid stream is extruded from the spinning orifices so as to cause an elongation or stretching of the fibers thereby orienting the polymer chains. Additional stretching may be effected by the use of stretching wheels positioned in line following the collecting reel. The stretching reels rotate at progressively increasing surface speeds, thereby causing further stretching or elongation of the fibers. While it is preferred to stretch the fibers after extrusion it is possible in some instances to obtain suitably oriented fibers merely by forcing the sol through a spinnerette followed by setting the extruded sol in a coagulating bath as has heretofore been described. Advantageously, the orientation of the polymeric carbohydrate chain imparts a chewy characteristic to the fibers which becomes more evident as the amount of orientation to which the fiber has been subjected is increased. This chewy characteristic contributing to the over-all desired textural characteristics of the product is very desirable.

By the term "combined sol" is meant a physical mixture of the polymeric carbohydrate gel precursor and a modifying agent.

After the fibers are formed, they are treated to gel the precursor and transform the farinaceous and/or proteinaceous material, if present and of a modifiable nature, from its sol state into a substantially solid state. Gelation of the polymeric carbohydrate gel precursor can either precede or take place concurrently with the modification of the farinaceous and/or proteinaceous materials dispersed throughout the sol when such materials are present. When the proteinaceous materials are dispersed in the sol, the nature of the composite fiber resulting upon gelation of the precursor and either coagulation or precipitation of the proteinaceous material is rubbery and elastic and considerably more meat-like in character than gel fibers formed from the polymeric carbohydrate gel precursors alone. However, unique eating qualities such as chewiness are also obtained when proteinaceous materials like soy bean meal, peanut meal, fish protein meal, and agglomerates thereof are simply incorporated in the gel precursor sol and are substantially uncoagulable or unprecipitable. When the farinaceous materials are dispersed in the sol, the nature of the composite fiber resulting upon gelation of the precursor and cooking of the farinaceous material is crisp and friable.

As indicated above, the gel precursor can be gelled either before the aforesaid transformation of the farinaceous and/or proteinaceous material, simultaneous with said transformation, or after said transformation; preferably the gel precursor is gelled before such transformation. In the combined sol state and in the fibers formed therefrom the gel precursor is distributed in such a manner as to provide, when gelled, a substantially continuous thermostable carrying structure for the proteinaceous material. In this connection, such thermostable gel precursors as are derived from algins or pectins and like polymeric carbohydrates, to wit, alkali salts of alginic acid and low methoxyl pectin, and generally having a high order of sensitivity to reaction with polyvalent cations, may be employed. The gel forming agents thus may be such alkaline earth metal ions as calcium and the like. Such cations are capable of serving a dual capacity in that in addition to gelling the gel precursor, they modify many of the proteinaceous materials employed.

The combined sol can be extruded as fibers in extremely close proximity to one another into a gelling bath. When it is desired to use external binders or modifying agents, then the treated fibers can be bound together by means of edible binders or modifying agents such as albumins, cereals, fats, starches and like edible substances. Where raw doughs are present in the extruded fibers, the fibers can be, subsequent to gelation, subjected to heat to cook the dough. In the alternative the fibers can be extruded into a hot gelling bath so as to concurrently gel the fibers and cook the dough.

In carrying out the present invention an aqueous solution of the polymeric carbohydrate material is preferably mixed with the farinaceous and/or proteinaceous material to provide a homogeneous dispersion. Among the farinaceous materials which may be employed are flours such as wheat, corn, rye, potato, etc., starches such as corn, wheat, potato, etc., and like farinaceous ingredients. Among the proteinaceous material which may be employed are gelable extracts of soy bean meal, peanut meal, fish protein meal and the like obtained by alkaline digestion of such meals; albumins such as egg albumin and soy albumin; albuminoids such as gelatin; caseins such as sodium caseinate and calcium para-caseinate; globulins; glutelins such as vitalized wheat gluten; histones; lactalbumin; lactoglobulin; and prolamines. To this sol may be added still other color, flavor and texture modifying agents, either miscible or non-miscible with the sol and included in this group are such materials as hydrogenated cottonseed oil, lard, chicken fat, tallow, beef extracts, chicken extracts, monosodium glutamate, dry skim milk powder and various cooked or uncooked comminuted fruits, vegetables and meats. Polymeric carbohydrate materials such as sodium alginate or low methoxyl pectin have a high calcium sensitivity and are thus quite suitable for the present process in that they can be reacted with various water-soluble calcium salts such as calcium acetate and the like which can serve either separate or dual roles as gelling cations and/or protein-coagulating or precipitating agents.

The products of the present invention, depending on the modifying agent employed, possess the desirable texture, appearance, flavor, aroma, etc., of fibrous biscuits, dry cereals, meats, fish, poultry and the like with the further advantage that these products are stable when subjected to cooking operations such as baking, boiling, broiling, frying, toasting, etc. Alternatively, the fibers can be frozen during or after fiber formation to further modify the texture of the fibers. Also, the fibers can be dried to a moisture at which the product is stable and be thereafter rehydrated in manufacture or in the home. The above uncooked, cooked, frozen or dried fibers can be aggregated in elongated form or can be subdivided in short lengths after or before their aggregation and after such subdivision can be re-aggregated to provide a random arrangement of fibers or fiber masses with novel chewy masticating properties and texture.

The products of this invention can be subsequently processed by conventional method of drying, freezing or canning for distribution and marketing.

The following examples serve as illustrations of several of the applications of the invention:

*Example 1*

An aqueous colloidal solution containing 3% sodium alginate (900 centipoises), 3.75% dried egg albumin and sufficient chicken fat and extracted chicken flavor to give a desirable chicken taste to the product was extruded through a 50 hole spinnerette having 0.008 inch diameter holes into a coagulating vat containing 10% by weight of calcium acetate and 1% by weight of acetic acid. The treated filaments which formed in the coagulating vat were taken up on a collecting reel and were then washed with pure water. The washed fibers were then bundled together by heating to form a food which resembled raw chicken meat in general appearance and touch. This food could be heated in an oven in much the same way as chicken meat would be heated, resulting in a food which bore a very close resemblance with respect to general appearance, texture and taste to that of cooked chicken.

*Example II*

An aqueous colloidal solution containing 2129 cc. of water, 80 gms. of sodium alginate (100 centipoises) and 20 gms. of dried egg albumin was extruded through a 50 hole spinnerette having 0.008 inch diameter holes into a coagulating vat containing 10% by weight of calcium acetate and 1% by weight of acetic acid. The treated filaments which formed in the coagulating vat were taken up on a collecting reel and were then washed with pure water at a temperature of 180° F. while in close proximity to each other thereby coagulating the egg albumin and forming the tows or bundles. The washed bundled fibers formed a food product which resembled the meat of raw shell fish or crustaceans in general appearance and touch. This food could be heated in an oven much in the same way that shell fish meat or crustacean meat could be heated.

*Example III*

An aqueous colloidal solution containing 3% sodium alginate (900 centipoises) and 7% dry solvent extracted soy bean meal was extruded through a 50 hole spinnerette having 0.008 inch diameter holes into a coagulating vat containing 10% by weight of calcium acetate and 1% by weight of acetic acid. The treated filaments which formed in the coagulating vat were taken up on a collecting reel and were then washed with pure water. A nutritious, high protein fiber having desirable chewing and eating properties was obtained.

*Example IV*

An aqueous colloidal solution containing 3% sodium alginate (900 centipoises) and 5% commercial casein was extruded through a 50 hole spinnerette having 0.008 inch diameter holes into a coagulating vat containing 10% by weight of calcium acetate and 1% by weight of acetic acid. The treated filaments which formed in the coagulating vat were taken up on a collecting reel and were then washed with pure water. A nutritious, high protein fiber having desirable chewing and eating properties was obtained.

*Example V*

An aqueous colloidal solution containing 3% sodium alginate (900 centipoises) and 12% corn steep water concentrate containing 50% solids was extruded through a 50 hole spinnerette having 0.008 inch diameter holes into a coagulating vat containing 10% by weight of calcium acetate and 1% by weight of acetic acid. The treated filaments which formed in the coagulating vat were taken up on a collecting reel and were then washed with pure water. A nutritious, high protein fiber having desirable chewing and eating properties was obtained.

*Example VI*

Two hundred grams of whole wheat flour (through a 70 mesh U.S. standard screen) is made into a dough with 300 grams of water. The dough is cooked with steam for ten minutes at 15 p.s.i.g. and then mixed with 300 cc. of a 2%, 100 centipoise sodium alginate solution. The viscous mass is extruded through a 100 hole spinnerette having 0.02 inch diameter holes into a coagulating bath containing 10% calcium acetate solution. The fibers are rinsed free of excess calcium acetate, brought into close proximity with one another so as to form bundles and dried. The fiber bundles have the appearance and textural feel of wheat shreds. They are brown in color, have a crisp friable texture and are capable of being toasted to obtain a desirable toasted cereal flavor. The fiber bundles have a relatively low rate of hydration in comparison to dry cereals.

*Example VII*

Two hundred grams of commercial semolina flour is made into a dough with 300 grams of water. The dough is cooked with steam for ten minutes at 15 p.s.i.g. and then mixed with 300 cc. of a 2%, 100 centipoise sodium alginate solution. The viscous mass is extruded through a 100 hole spinnerette having 0.02 inch diameter holes into a coagulating bath containing 10% calcium acetate solution. The fibers are rinsed free of excess calcium acetate, brought into close proximity with one another so as to form bundles and dried. The fiber bundles have the appearance and textural feel of cereal shreds. They are golden yellow in color, have a crisp, friable texture and are capable of being toasted to obtain a desirable brown color and toasted cereal flavor. The fiber bundles have a relatively low rate of hydration in comparison to dry cereals.

*Example VIII*

Seventy-five grams of commercial, uncooked, defatted soy flour (Soy Fluff), 75 grams corn flour and 275 grams of water are mixed to form a dough. Four hundred cc. of a solution containing 20 g. low methoxyl pectin (Exchange Pectin LM 466—approximately 30% DM) and 20 grams sugar are added to obtain a viscous mass which is then extruded through a 100 hole spinnerette having 0.02 inch diameter holes into a coagulating bath containing 10% calcium acetate solution. The fibers are rinsed free of excess calcium acetate, brought into close proximity with one another so as to form bundles and dried. The fiber bundles have the appearance and textural feel of wheat shreds. They are light brown in color, crisp, friable and are capable of being toasted to obtain a desirable brown color and toasted cereal flavor. They have a relatively low rate of hydration in comparison to dry cereals.

It will be understood that while the invention has been described in part by means of specific examples reference should be had to the appended claims for a definition of the scope of the invention.

What is claimed is:

1. A process for preparing an edible food product having a fibrous texture which comprises forming a sol of a polymeric carbohydrate gel precursor capable of producing a continuous thermostable gel, forming said sol into oriented, gelled fibers, said gelation being caused by the use of an alkaline earth metal ion.

2. A process for preparing an edible food product having a fibrous texture which comprises forming a sol of a polymeric carbohydrate gel precursor capable of producing a continuous thermostable gel, forming said sol into fibers, orienting said fibers during formation, and gelling said fibers with an alkaline earth metal ion.

3. A process for preparing an edible food product having a fibrous texture which comprises forming a sol of a polymeric carbohydrate gel precursor capable of producing a continuous thermostable gel, forming said sol into fibers, gelling said fibers with an alkaline earth metal ion and orienting said gelled fibers.

4. A process for preparing an edible food product having a fibrous texture which comprises forming a sol of a polymeric carbohydrate gel precursor capable of producing a continuous thermostable gel, forming said sol into fibers, gelling said fibers with an alkaline earth metal ion, orienting said gelled fibers, and aggregating said gelled fibers.

5. A process for preparing an edible food product having a fibrous texture which comprises forming a sol of a polymeric carbohydrate gel precursor capable of producing a continuous thermostable gel, dispersing into said sol a modifying agent, forming said sol into fibers, gelling said fibers with an alkaline earth metal ion, orienting said gelled fibers, and aggregating said gelled fibers to produce a fibrous composition having a continuous thermostable structure containing said modifying agent.

6. A process for preparing a nutritious edible food product having a fibrous texture which comprises forming a sol of a polymeric carbohydrate gel precursor capable of producing a continuous thermostable gel, dispersing into said sol a farinaceous material, forming said sol into fibers, gelling said fibers with an alkaline earth metal ion to produce a continuous thermostable structure containing said farinaceous material, orienting said gelled fibers, and aggregating a plurality of said gelled fibers to produce a fibrous composition.

7. A process for preparing a nutritious edible food product having a fibrous texture which comprises forming a sol of a polymeric carbohydrate gel precursor capable of producing a continuous thermostable gel, dispersing into said sol a proteinaceous material, forming said sol into fibers, gelling said fibers with an alkaline earth metal ion to produce a continuous thermostable structure containing said proteinaceous material, orienting said gelled fibers and aggregating a plurality of said gelled fibers to produce a fibrous composition.

8. A process for preparing a nutritious edible food product having a fibrous texture which comprises forming a sol of a polymeric carbohydrate gel precursor capable of producing a continuous thermostable gel, dispersing into said sol a modifiable farinaceous material capable of being dispersed with said precursor and of being transformed into a substantially solid state, forming said dispersion into fibers, gelling said precursor in said fibers with an alkaline earth metal ion to produce a continuous thermostable carrying structure for the farinaceous material, orienting said gelled fibers, transforming said farinaceous material into a substantially solid state, and aggregating a plurality of the fibers thus treated to produce a fibrous composition.

9. A process for preparing a nutritious edible food product having a fibrous texture which comprises forming a sol of a polymeric carbohydrate gel precursor capable of producing a continuous thermostable gel, dispersing into said sol a modifiable proteinaceous material capable of forming a sol with said precursor and of being transformed from said sol state into a substantially solid state, forming said combined sol into fibers, gelling said precursor in said fibers with an alkaline earth metal ion to produce a continuous thermostable structure containing said proteinaceous material, orienting said gelled fibers, transforming said proteinaceous material into a substantially solid state, and aggregating a plurality of the fibers thus treated to produce a fibrous composition.

10. A process for preparing a nutritious edible food product having a fibrous texture which comprises forming a sol of a polymeric carbohydrate gel precursor capable of producing a continuous thermostable gel, dispersing into said sol a coagulable proteinaceous material capable of forming a sol with said precursor, forming said combined sol into fibers, gelling said precursor in said fibers with an alkaline earth metal ion to produce a continuous thermostable carrying structure for the proteinaceous material, orienting said gelled fibers, coagulating said proteinaceous material, and aggregating a plurality of the fibers thus treated to produce a fibrous composition.

11. A process for preparing a nutritious edible food product having a fibrous texture which comprises forming a sol of a polymeric carbohydrate gel precursor capable of producing a continuous thermostable gel, dispersing into said sol a precipitable proteinaceous material capable of forming a sol with said precursor, forming said combined sol into fibers, gelling said precursor in said fibers with an alkaline earth metal ion to produce a continuous thermostable carrying structure for the proteinaceous material, orienting said gelled fibers precipitating said proteinaceous material, and aggregating a plurality of the fibers thus treated to produce a fibrous composition.

12. A process according to claim 8 wherein said precursor is gelled prior to transformation of said farinaceous material to a substantially solid state.

13. A process according to claim 9 wherein said precursor is gelled prior to transformation of said proteinaceous material to a subshtantially solid state.

14. A process according to claim 13 wherein the proteinaceous material is coagulable.

15. A process according to claim 13 wherein the proteinaceous material is precipitable.

16. A process according to claim 13 wherein the proteinaceous material is heat coagulable.

17. A process according to claim 13 wherein the fibers are formed from said combined sol by extrusion.

18. A process according to claim 12 wherein the gel precursor is derived from algin.

19. A process according to claim 12 wherein the gel precursor is derived from pectin.

20. A process according to claim 13 wherein the gel precursor is derived from algin.

21. A process according to claim 13 wherein the gel precursor is derived from pectin.

22. A process according to claim 9 wherein the fibers are formed from said combined dispersion by extrusion.

23. A process according to claim 8 wherein the aggregated fibers are subsequently cooked.

24. A process according to claim 9 wherein the aggregated fibers are subsequently cooked.

25. A process for preparing a nutritious edible food product having a fibrous texture which comprises forming a sol of a polymeric carbohydrate gel precursor capable of producing a continuous thermostable gel, dispersing into said sol a modifiable proteinaceous material capable of forming a sol with said precursor and of being transformed from said sol state into a substantially solid state and a farinaceous material capable of forming a dispersion with said gel precursor and of being transformed into a substantially solid state, forming said gel precursor sol containing said proteinaceous material and said farinaceous material into fibers, gelling said precursor in said fibers with an alkaline earth metal ion to produce a continuous thermostable carrying structure for the proteinaceous and farinaceous materials and transforming said proteinaceous and farinaceous materials into a substantially solid state, orienting said gelled fibers aggregating a plurality of the fibers thus treated to produce fibrous composition and drying said composition.

26. An edible food product comprising an aggregation of treated fibers, each of said treated fibers being composed of a continuous thermostable oriented polymeric carbohydrate carrying structure.

27. A nutritious edible food product comprising an aggregation of treated fibers, each of said treated fibers being composed of a continuous thermostable oriented polymeric carbohydrate carrying structure having dispersed therein proteinaceous material.

28. A product according to claim 27 wherein the aggregation of fibers are bound together by means of an edible binder.

29. A nutritious edible food product comprising an aggregation of treated fibers, each of said treated fibers being composed of a continuous thermostable oriented polymeric carbohydrate carrying structure having dispersed therein farinaceous material.

30. A product according to claim 29 wherein the aggregation of treated fibers, each of said treated fibers edible binder.

31. A nutritious edible food product comprising an aggregation of treated fibers, each of said treated fibers being composed of a continuous thermostable oriented polymeric carbohydrate carrying structure having dispersed therein farinaceous and proteinaceous materials.

32. A product according to claim 31 wherein the aggregation of fibers are bound together by means of an edible binder.

33. A nutritious edible food product comprising an aggregation of treated fibers, each of said treated fibers being composed of a continuous thermostable oriented polymeric carbohydrate carrying structure having dispersed therein comminuted materials selected from the group consisting of fruits, vegetables, and meats.

34. A product according to claim 33 wherein the aggregation of fibers are bound together by means of an edible binder.

References Cited in the file of this patent

UNITED STATES PATENTS

| | | |
|---|---|---|
| 2,791,508 | Rivoche | May 7, 1957 |
| 2,830,902 | Anson et al. | Apr. 15, 1958 |

UNITED STATES PATENT OFFICE

CERTIFICATE OF CORRECTION

Patent No. 3,093,483                                               June 11, 1963

Norman H. Ishler et al.

It is hereby certified that error appears in the above numbered patent requiring correction and that the said Letters Patent should read as corrected below.

Column 4, line 27, for "material" read -- materials --; column 6, line 39, for "feed" read -- feel --; column 8, line 14, for "subshtantially" read -- substantially --; column 8, lines 74 and 75, strike out "treated fibers, each of said treated fibers edible binder" and insert instead -- fibers are bound together by means of an edible binder --.

Signed and sealed this 31st day of December 1963.

SEAL)
.ttest:
RNEST W. SWIDER                                    EDWIN L. REYNOLDS .ttesting Officer                                   Acting Commissioner of Patents